United States Patent
Odenheimer et al.

(10) Patent No.: US 10,528,552 B2
(45) Date of Patent: Jan. 7, 2020

(54) DYNAMIC AGGREGATION FOR BIG DATA ANALYTICS

(71) Applicant: SAP SE, Walldorf (DE)

(72) Inventors: Jens Odenheimer, Karlsruhe (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 485 days.

(21) Appl. No.: 15/490,069

(22) Filed: Apr. 18, 2017

(65) Prior Publication Data

US 2018/0300332 A1 Oct. 18, 2018

(51) Int. Cl.
*G06F 16/00* (2019.01)
*G06F 16/23* (2019.01)

(52) U.S. Cl.
CPC ................ *G06F 16/2393* (2019.01)

(58) Field of Classification Search
CPC .. G06F 16/2393; G06F 16/156; G06F 16/248; G06F 16/338; G06F 16/438; G06F 16/638; G06F 16/738; G06F 16/9038
See application file for complete search history.

(56) References Cited

U.S. PATENT DOCUMENTS

| | | | | |
|---|---|---|---|---|
| 6,487,546 | B1* | 11/2002 | Witkowski | G06F 16/284 |
| 6,931,418 | B1* | 8/2005 | Barnes | G06F 16/2264 |
| | | | | 707/776 |
| 8,521,774 | B1* | 8/2013 | Cai | G06F 16/24556 |
| | | | | 707/776 |
| 8,543,554 | B1* | 9/2013 | Singh | G06F 16/24552 |
| | | | | 707/690 |
| 10,417,243 | B1* | 9/2019 | Singh | G06F 16/2471 |
| 2002/0029207 | A1* | 3/2002 | Bakalash | G06F 16/2455 |
| 2002/0099691 | A1* | 7/2002 | Lore | G06F 16/2237 |
| 2014/0310232 | A1* | 10/2014 | Plattner | G06F 16/24539 |
| | | | | 707/602 |
| 2015/0339207 | A1* | 11/2015 | Hod | G06F 11/3409 |
| | | | | 717/124 |
| 2016/0350394 | A1* | 12/2016 | Gaumnitz | G06F 16/285 |
| 2018/0300332 | A1* | 10/2018 | Odenheimer | G06F 16/2393 |

* cited by examiner

*Primary Examiner* — Noosha Arjomandi
(74) *Attorney, Agent, or Firm* — Buckley, Maschoff & Talwalkar LLC

(57) ABSTRACT

A big data database may store information to be used to generate results of aggregation queries. An aggregation query platform may include an aggregation query broker that receives an aggregation query from a remote user interface associated with a user and evaluates the aggregation query to determine if the aggregation query qualifies to be designated as a live query. The aggregation query platform may also include a dynamic aggregation engine to, if the aggregation query is designated as a live query by the aggregation query broker, store an indication of the aggregation query and automatically update a local dynamic result of the aggregation query when information in the big data database associated with the live query is changed.

18 Claims, 12 Drawing Sheets

DYNAMIC AGGREGATION FOR BIG DATA ANALYTICS

FIELD

Some embodiments are associated with database queries. In particular, some embodiments are directed to dynamic aggregation queries associated with big data analytics.

BACKGROUND

A user may want to analyze a relatively large amount of "big data," such as information associated with life sciences information (e.g., genome and protein data), warehouse data, internet usage patterns, Internet of Things ("IoT") observations, etc. For example, the user might want to query a big data database to aggregate information during an analytic process.

It may therefore be desirable to provide systems and methods to facilitate aggregation query responses in an efficient and accurate manner.

SUMMARY OF THE INVENTION

According to some embodiments, systems, methods, apparatus, computer program code and means are provided to facilitate aggregation query responses in an efficient and accurate manner. In some embodiments, a big data database may store information to be used to generate results of aggregation queries. An aggregation query platform may include an aggregation query broker that receives an aggregation query from a remote user interface associated with a user and evaluates the aggregation query to determine if the aggregation query qualifies to be designated as a live query. The aggregation query platform may also include a dynamic aggregation engine to, if the aggregation query is designated as a live query by the aggregation query broker, store an indication of the aggregation query and automatically update a local dynamic result of the aggregation query when information in the big data database associated with the live query is changed.

Some embodiments comprise: means for receiving, by an aggregation query broker of an aggregation query platform, an aggregation query from a remote user interface associated with a user, the aggregation query being associated with a big data database storing information to be used to generate results of aggregation queries; means for evaluating, by the aggregation query broker, the aggregation query to determine if the aggregation query qualifies to be designated as a live query; and, if the aggregation query is designated as a live query by the aggregation query broker: means for storing by a dynamic aggregation engine an indication of the aggregation query, and means for automatically updating, by the dynamic aggregation engine, a local dynamic result of the aggregation query when information in the big data database associated with the live query is changed.

In some embodiments, a communication device associated with an aggregation query platform exchanges information with a remote user interface device. The information may be exchanged, for example, via public and/or proprietary communication networks.

Technical effects of some embodiments of the invention are improved and computerized ways to facilitate aggregation query responses in an efficient and accurate manner. With these and other advantages and features that will become hereinafter apparent, a more complete understanding of the nature of the invention can be obtained by referring to the following detailed description and to the drawings appended hereto.

DETAILED DESCRIPTION

Figure 1:
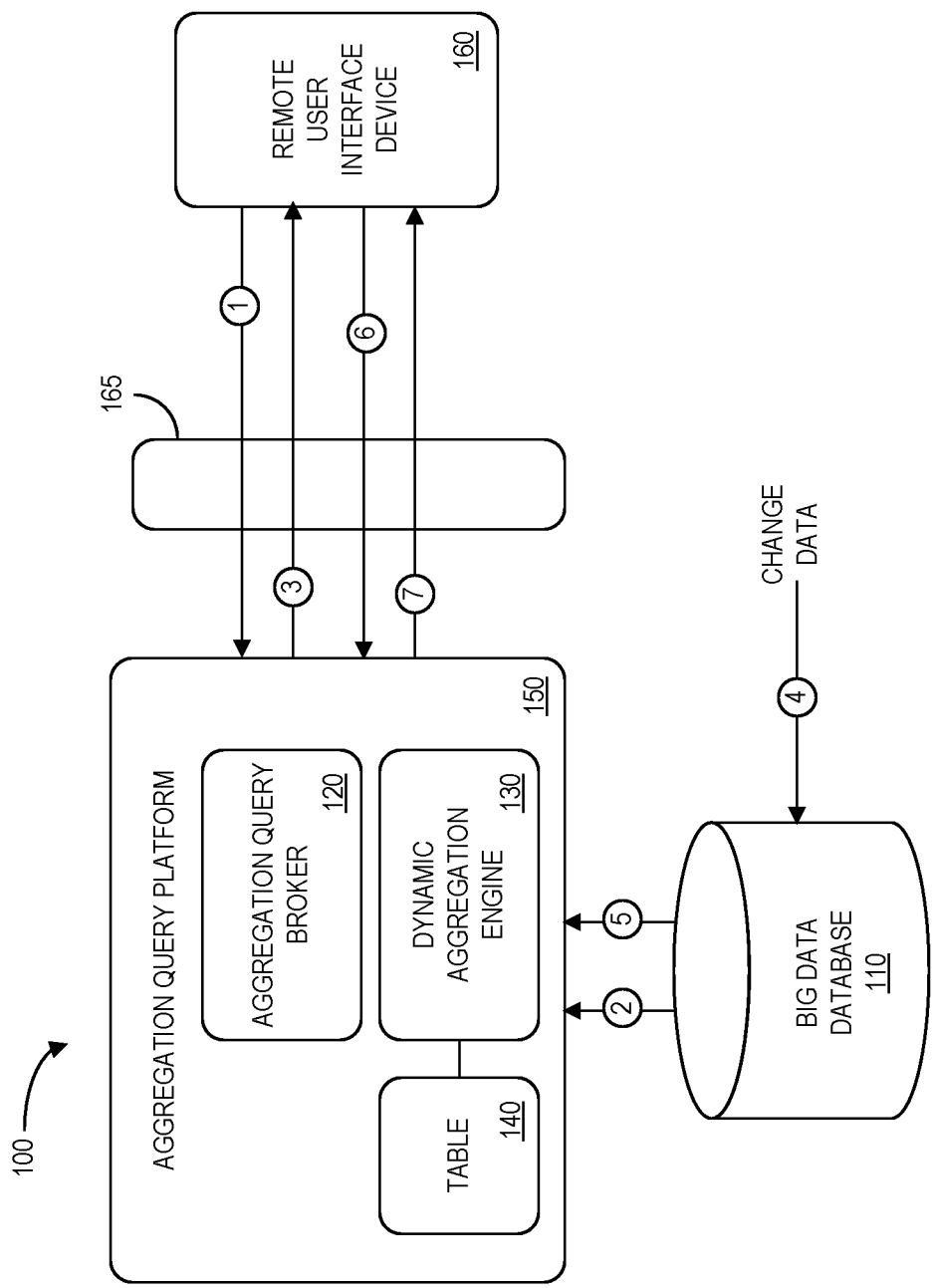
FIG. 1 is a high level block diagram of a computer system in accordance with some embodiments.

The following description is provided to enable any person in the art to make and use the described embodiments and sets forth the best mode contemplated for carrying out some embodiments. Various modifications, however, will remain readily apparent to those in the art.

The field of software-based analytics has experienced a shift from pre-aggregated data to in-memory, on-the-fly computation. Note that pre-aggregated data may be efficient if a user frequently has similar queries while in-memory, on-the-fly computation might be more appropriate to handle queries of different types. In some cases, such as in the field of health-care and personalized medicine analytics, a hybrid scenario may exist such that the system might benefit from combining pre-aggregated data and on-the-fly computed data.

Consider, for example, data associated with plant genomics and crop sciences that contains genomes of many different individual plants (e.g., thousands of corn plants). An end-user of such a life science system might be interested in analyzing the samples by comparing individual properties to statistics in accordance with certain cohorts (e.g., all corn samples collected in the United States or Asia). As other examples, a user might want to define cohorts based on fertilization amounts, pesticide utilization, drought resilience, etc. Note that the end-user will often be interested in comparing either an individual sample to a particular cohort (or even comparing one cohort to another cohort). Note that a cohort may be associated with a quasi-static entity. Moreover, cohorts may be defined at a particular point in time, have a certain life span (e.g., a period of time during which it is frequently used), and may eventually be deleted. Also note that some cohorts might tend to be long-lasting (e.g., all samples collected in the US) while other cohorts might be more temporary in nature (e.g., a test for randomness, such as all samples beginning with the letter "R").

With in-memory technology, the primary focus has been on computing results "on-the-fly" (that is, in response to a request from a user), which can in some cases be very successful. In some cases, however, such an approach results in the system continuously performing the same calculations over and over. Consider, for example, a system in which a first user compares sample A to a United States cohort, a second user compares sample B to an Asian cohort, and a third user compares the United States and Asian cohorts. In all three cases, the statistical properties of the United States and Asian cohorts would be computed on-the-fly in response to the user requests. If, however, the quantities of interest were pre-aggregated for the United States and Asian cohorts, the processing required to respond to queries from the first and second users would be reduced (because the system would be comparing samples A and B with the pre-aggregated cohorts). The processing required to respond to the third user's query would be drastically reduced (because both of those cohorts would already have been aggregated).

As another example, a user might want to compare genetic variants from three specific samples with the variant density of an entire genepool. Note that the variant density is a count operation based on a specific bin size (e.g., a bin size based on a user entry or calculated by display size). In this case, the system would aggregate the number of variants in the bin sizes for the chromosomes of each of the samples. The system would also perform the same operation on the entire population. If everything is computed on-the fly, the query might take, for example, 50 seconds to process. If the system instead used selective pre-aggregation in accordance with embodiments described herein (such that the variant density of the entire genepool is pre-aggregated) the query might only take 2 seconds to process. As still another example, consider a calculation associated with linkage disequilibrium (the non-random association of alleles at different loci in a given population). In this case, the system might compute average statistical quantities (e.g., DP values) of respective sample set with respect to a certain bin size. The "aggregate" in this case would be the averaged data.

Thus, it might be desirable to provide system such that a dynamic pre-aggregation of relevant data is achieved. FIG. 1 is a high-level block diagram of a system 100 according to some embodiments of the present invention. In particular, the system 100 includes a big data database 110 that provides information to an aggregation query platform 150. The aggregation query platform 150 may also exchange information with a remote user interface device 160 (e.g., via a firewall 165). According to some embodiments, a cloud embedded aggregation query broker 120 and dynamic aggregation engine 130 execute at the aggregation query platform 150 to facilitate query responses. According to some embodiments, the aggregation query platform 150, aggregation query broker 120, and/or dynamic aggregation engine 130 might be associated with a research institute or a third-party, such as a vendor that performs a service for an enterprise.

The aggregation query platform 150 might be, for example, associated with a Personal Computer ("PC"), laptop computer, smartphone, an enterprise server, a server farm, and/or a database or similar storage devices. According to some embodiments, an "automated" or "semi-automated" aggregation query platform 150, aggregation query broker 120, and/or dynamic aggregation engine 130 may processing information that is provided to the remote user interface device 160. As used herein, the term "automated" may refer to, for example, actions that can be performed with little (or no) intervention by a human.

As used herein, devices, including those associated with the aggregation query platform 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such distributed communication networks.

The aggregation query platform 150 may store information into and/or retrieve information from the big data database 110. The big data database 110 might, for example, store a set of electronic records associated with the human genome. The big data database 110 may be locally stored or reside remote from the aggregation query platform 150. As will be described further below, the big data database 110 may be used by the aggregation query platform 150 to automatically respond to queries from one or more remote user interface devices 160. Although a single aggregation query platform 150 is shown in FIG. 1, any number of such devices may be included. Moreover, various devices described herein might be combined according to embodiments of the present invention. For example, in some embodiments, the aggregation query platform 150 and big data database 110 might be co-located and/or may comprise a single apparatus.

According to some embodiments, the system 100 may automatically respond to user queries. For example, at (1) the remote user interface device 160 might transmit a query to the aggregation query platform 150. At (2), the aggregation query platform 150 may access information from the big data database 110 and transmit a response (e.g., a query result) to the remote user interface device 16 at (3). As will be described, the aggregation query platform 150 might designate the received query as a "live query" that will be automatically and locally updated when relevant information in the big data database 110 changes (without receiving a query from a user). For example, when information is changed at (6), the dynamic aggregation engine 130 may access the new data at (5) and store an updated result in a local table 140. As a result, when a similar query is received at (6), the aggregation query platform 150 can use the pre-aggregated data in the table 140 to quickly create a result that is transmitted to the user at (7).

In some embodiments described herein, a computer system may include applications that are released and able to run on various combinations of database systems, Operating Systems ("OSs"), virtualization layers and cloud services, such as Infra-Structure as a Service ("IaaS") implementations. Moreover, embodiments might include real time analytics, interactive data exploration, and/or an application platform associated with, for example, the High-performance ANalytic Appliance ("HANA") in-memory, column-oriented, relational database management system developed and marketed by SAP SE®. Such an application platform might include, for example, an OnLine Analytical Processing ("OLAP") engine, a predictive engine, a spatial engine, application logic, a rendering platform, etc. A real-time data acquisition device may include landscape transformation, a replication server, and/or an event stream processor. According to some embodiments, an application platform and/or real-time data acquisition device may exchange information with transactional, analytical, online applications. An application platform may also exchange information with customer mobile applications (e.g., associated with mobile platforms), a business object suite (e.g., associated with exploration, reporting, dashboarding, predictive functions, and/or mobile versions), business objects data services, etc.

Figure 2:
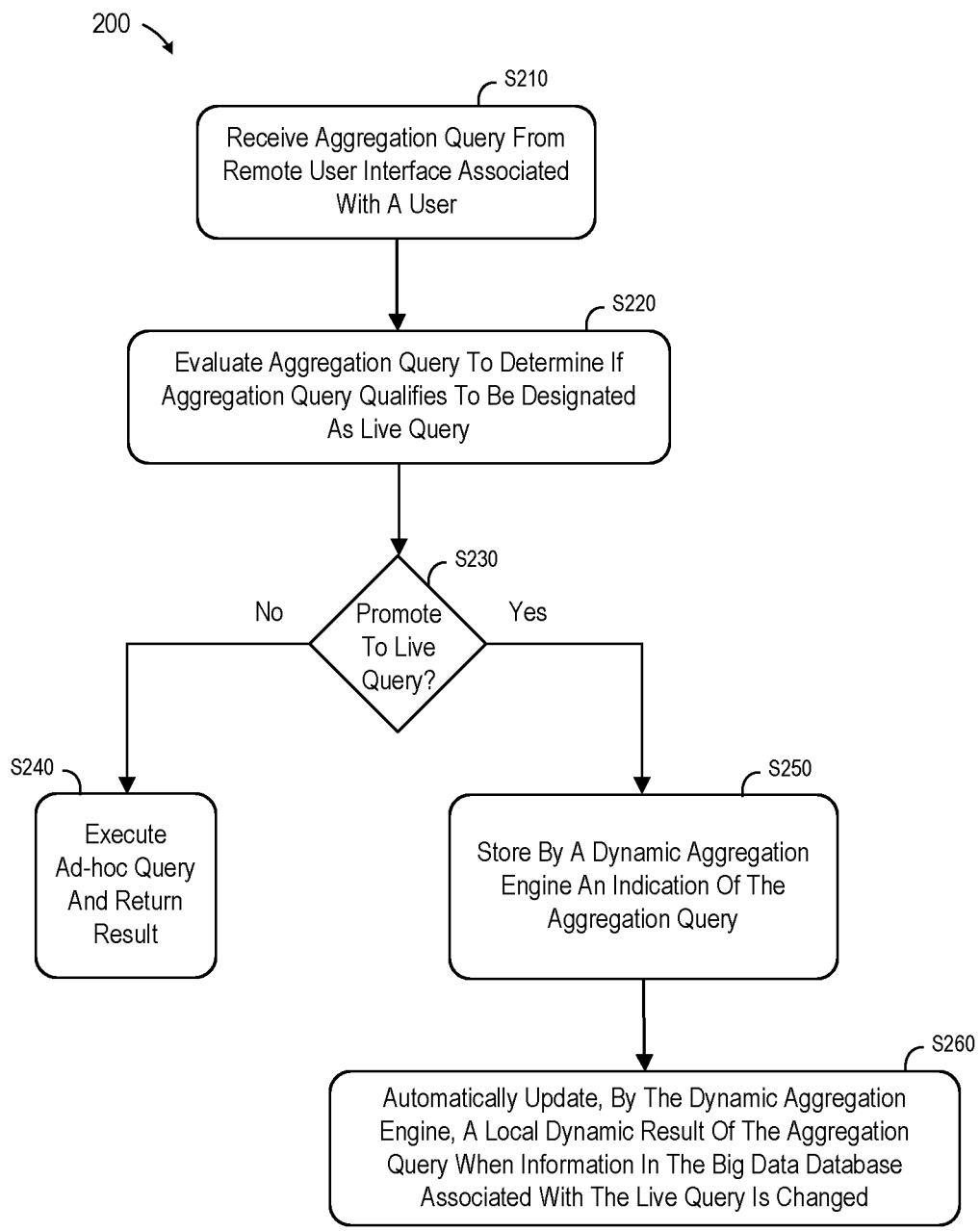
FIG. 2 is a flow diagram of a process owner method according to some embodiments.

Note that the system 100 of FIG. 1 is provided only as an example, and embodiments may be associated with additional elements or components. According to some embodiments, the elements of the system 100 automatically support the creation and use of live queries. FIG. 2 illustrates an aggregation query platform method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an aggregation query broker of an aggregation query platform may receive an "aggregation query" from a remote user interface associated with a user. According to some embodiments, the aggregation query is associated with a big data database storing information to be used to generate results of aggregation queries (e.g., a database storing pre-aggregated data and/or in-memory on-the-fly computed data). As used herein, the phrase "aggregation query" might refer to, for example, a cohort, a quasi-statistic entity, linkage disequilibria, a filtered subset of a result set, a count operation, an average operation, a mean operation, a variant density, an operation combined with a filter, etc.

At S220, the aggregation query broker may evaluate the aggregation query to determine if the aggregation query qualifies to be designated as a "live query." As used herein, the phrase "live query" might refer to, example, a database query that is remembered and automatically updated by the system. As a result, when a user submits a new query associated with the live query, a result may be quickly returned to the user without needing to re-evaluate the query.

According to some embodiments, the evaluation performed at S220 is based at least in part on a number of times the aggregation query was received from the remote user interface associated with the user (e.g., if a particular query is received five times from the same user it might be designated as a live query). As another example, the evaluation performed at S220 is based at least in part on a number of times the aggregation query was received from remote user interfaces associated with other users. In still other embodiments, the evaluation at S220 is based at least in part on a query execution runtime associated with aggregation query (e.g., if a query only take one second to calculate on-the-fly it might not be worth designating it as a live query).

According to some embodiments, the evaluation to determine if the aggregation query qualifies to be designated as a live query is performed by a candidate promoter that evaluates a plurality of potential live queries stored in a candidate repository. For example, the candidate promoter might utilize candidate configuration rules associated with one or more of: a current system load, a number of times the aggregation query has been received within a pre-determined period of time, a number of unique users associated with the aggregation query, a number of current live queries as compared to a threshold value, an invalidation time window, a self-adjusting promotion rule, etc. According to some embodiments, the candidate promoter might further evaluate a plurality of live queries to determine if any current live queries should be demoted (e.g., deleted or changed to a potential live query).

If the aggregation query does not qualify for promotion to live query status at S230, the query may be executed in an ad-hoc manner and the result can be transmitted to the user at S240. The term "ad-hoc" may refer to, for example, a query that goes directly to an application database, as if no dynamic aggregation framework existed. As will be described, even if the aggregation query does not qualify for promotion to live query status a copy of the query might be stored as a "candidate query" (i.e., a query that might later qualify to be promoted to live query status).

If the aggregation query does qualify for promotion to live query status at S230, a dynamic aggregation engine may store an indication of the aggregation query (e.g., in a live query repository) at S250. At S260, the dynamic aggregation engine may automatically update a local dynamic result of the aggregation query when information in the big data database associated with the live query is changed. This might be achieved, for example, by creating triggers on tables and views associated with the big data database.

Figure 3:
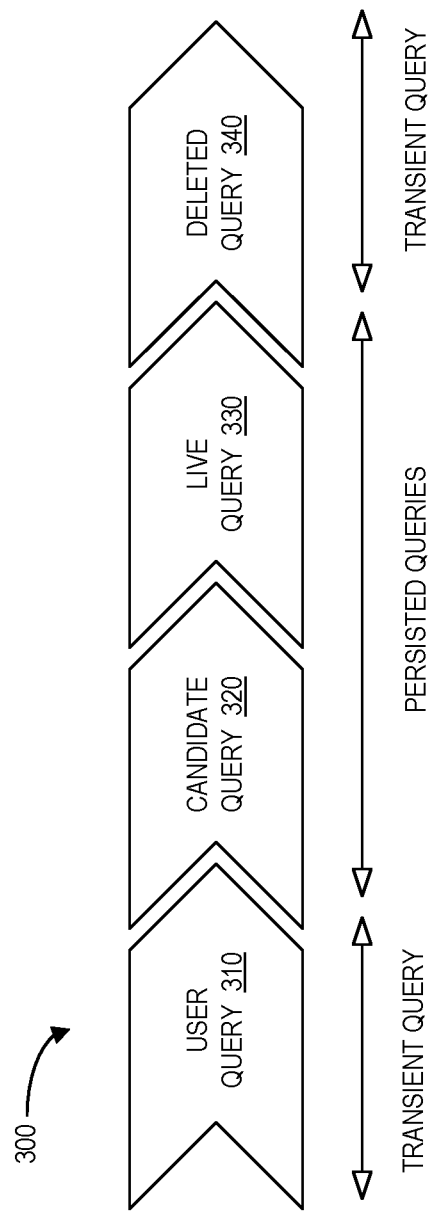
FIG. 3 illustrates a query lifecycle in accordance with some embodiments.

FIG. 3 illustrates a query lifecycle 300 in accordance with some embodiments. Initially, a new user query 310 (e.g., a transient query) is received, executed, and a result is returned to the user. The system may also store the user query 310 (and not the result) as a candidate query 320 (e.g., a persisted query). If the same user query 310 (or parts of the user query 310) are received several times, that candidate query 320 may be transformed into a live query 330. Note that a live query 330 not only persists its result when it is run but also creates triggers on the tables and views on which it is executed such that the result will be automatically updated when the underlying data is changed. In this way, the system always has "live" data available. The next time the live query 330 is received, the system does not need to execute the query again but will instead deliver the persisted result. According to some embodiments, the live queries are consistently monitored. If certain rules or metrics apply, the live query 330 and associated results are deleted 340 from the system (otherwise the number of live queries that need to be updated may continually grow and eventually place an unwieldy load on the system).

Figure 4:
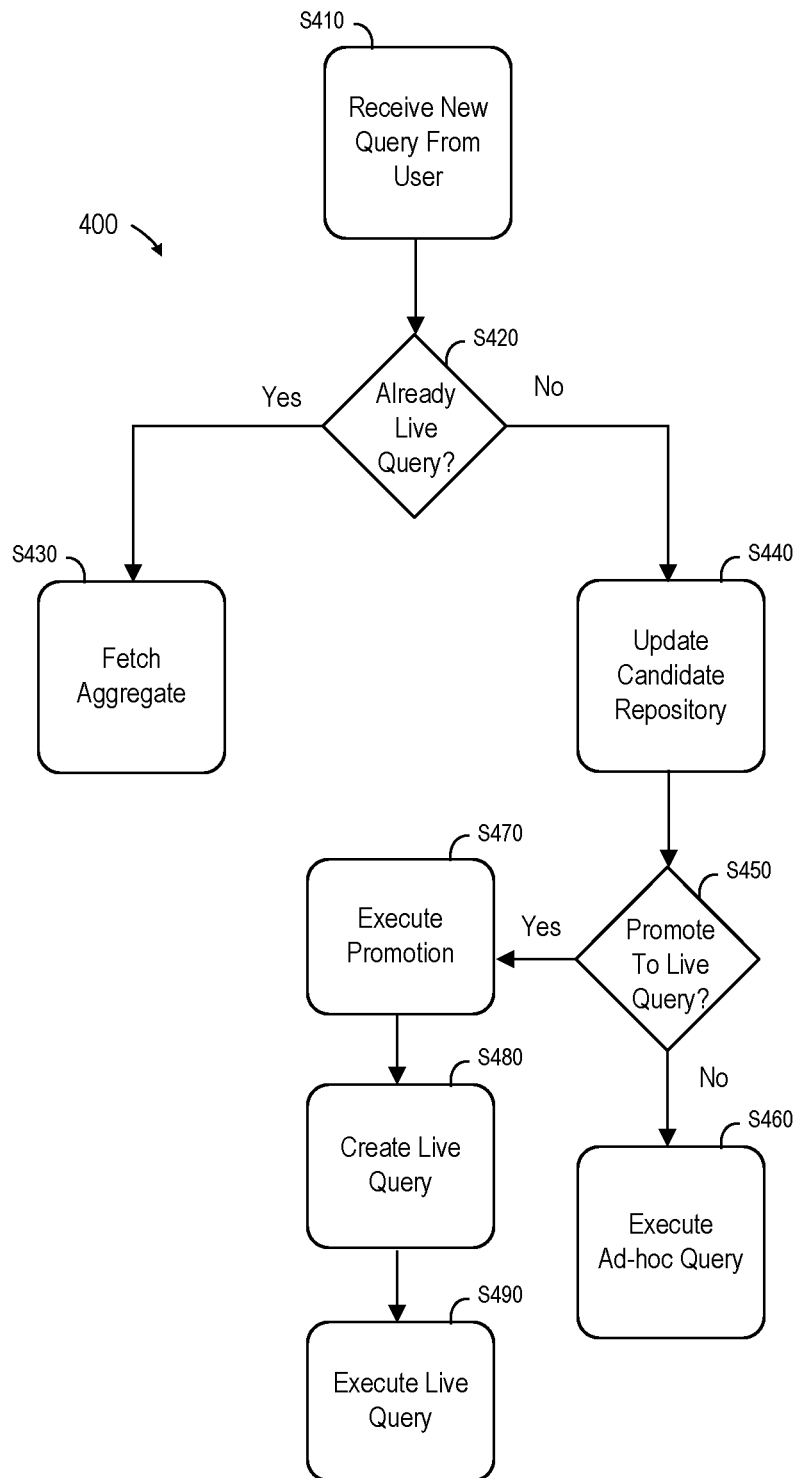
FIG. 4 is a detailed process flow according to some embodiments.

FIG. 4 is a detailed process flow 400 according to some embodiments. At S410, a new query is received from a user (e.g., asking to compare sample A to an Asian cohort). The query may be, for example, entered via a User Interface ("UI") and sent to a query broker. The query broker may then, at S420, check to see if the query (or a sub-part of the query) is already a live query. If so, the pre-aggregated data is fetched and used to create a result for the user at S430.

If the query is not already a live query at S420, a candidate repository may be updated at S440 (e.g., by adding the query to the repository or increasing a counter within the repository by one). At S450, a promotion check may determine if the candidate query shall be promoted to a live query. If not, the query is executed as-hoc at S460 and a result is returned to the user.

If the query qualifies for promotion at S450 (e.g., the query was received at least ten times in the last week), the promotion is executed at S470. The live query is then created at S480 (e.g., by moving the query from the candidate repository to a live query repository) and executed at S490. Note that the result might then be provided to the user and added to the live query repository in way that ensures it will be automatically updated when the underlying data is changed.

Figure 5:
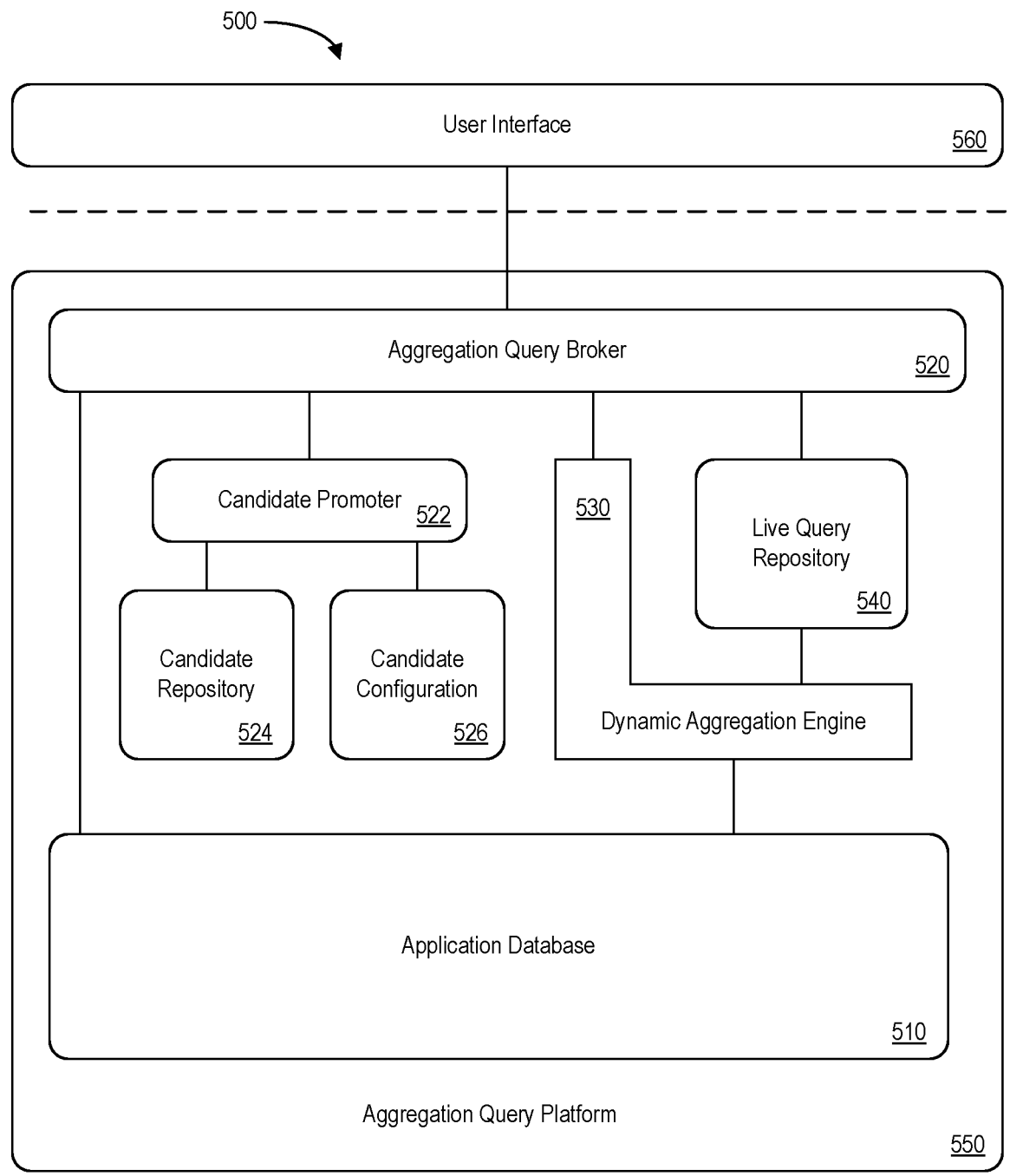
FIG. 5 is a component overview in accordance with some embodiments.

FIG. 5 is a component overview 500 in accordance with some embodiments. A UI 560 may communicate with an aggregation query platform 550 that includes an application database 510. The UI 560 and aggregation query platform 550 might communicate, for example, via any appropriate application layer protocol, such as a Hyper Text Transfer Protocol Secure ("HTTPS") or Remote Procedure Call ("RPC") interface. The UI 560 is the application interface to the end user that lets the user create his or her "aggregation" query. Note that as used herein, the term "aggregate" is not limited to a filtered subset of a result-set (although in some embodiments that may be the case). An aggregate may be associated with any result of applying an operation (e.g., count, average, mean, etc.) to a respective subset. Note that an aggregate might also be combined with a filter (e.g., as in a variant density analysis).

An aggregation query broker 520 may receive the aggregation query from the user. The aggregation query broker 520 may determine what to do with a query. In some cases, the aggregation query broker 520 may access the application database 510 directly in case of ad-hoc queries. In other cases, the aggregation query broker 520 might access a live query repository 540, a candidate promoter 522, and/or a dynamic aggregation engine 530.

The candidate promoter 522 may check a candidate repository 524 if the query is already a candidate. If not, the query may be added to the repository 524. If the query is already a candidate, the candidate promoter 522 may check a candidate configuration 526 to decide if the candidate should now be promoted to live query status. As used herein, a "candidate query" may refer to a query that is not yet a live query. A new user query might be automatically placed in the candidate repository 524 if it is not already a live query. Note that the results of the candidate query might only persisted if the candidate query is promoted to a live query (otherwise the query may be executed as an ad-hoc "one time" query).

The candidate configuration 526 may contain rules and logic for candidate promotion. Some examples of rules and logic that might be utilized include:
  A number of times the query has been called within a certain period of time,
  A query execution runtime,
  A number of unique users who submitted the query,
  A number of live queries active in the system (relative to a maximum number of allowed live queries), and
  An invalidation period (e.g., how soon are unused query results deleted?).

Note that the candidate configuration does not need to be a static set of parameters but may instead be self-adjusting (e.g., as the number of live queries maintained by the system increases). For example, when there are only very few live queries in the system, candidates might get promoted relatively quickly (i.e., after only a few executions). When the number of live queries that need to be kept up-to-date grows larger, fewer candidates might get promoted and/or some existing live queries may be deleted (or demoted to candidate status).

The dynamic aggregation engine 530 may return an appropriate result (aggregate) to the UI 560 for an existing live query. The dynamic aggregation engine 530 may also create an aggregate when a candidate query is promoted to a live query. In this case, the live query repository 540 may be updated. Note that the live query may be put into the repository 540 along with the result (aggregate). The term "live query" may refer to a user query (or a part of a user query) that been used several times (and is no longer a candidate query). When a user query is identified as a live query, the results (aggregates) may be fetched from the live query repository 540. Note that the results may be kept up-to-date by adding database triggers to the underlying tables and views to invalidate stale aggregates upon a change in underlying data. That is, the system may re-run the query in the background to have "live" data available the next time the query is used.

According to some embodiments, when a new live query is created the dynamic aggregation engine 530 creates a trigger on underlying application tables such that, when the tables are changed, the existing aggregate is deleted and the live query is scheduled for background execution. Whenever the interactive load on the system falls below a certain threshold, the next invalidated live query scheduled for execution is run and the new result is stored as an updated aggregate.

Note, however, that constantly updating invalidated live queries will creates a load on the system. To avoid too large of a load, the total number of live queries may be limited to a certain maximum amount. Therefore, the dynamic aggregation engine 530 may, in some embodiments, retire a live query when the candidate configuration 526 rules require invalidation (e.g., because the query has not been used for one month). In this case, the live query may be demoted to a candidate query and the aggregate may simply be deleted (and no longer updated).

Figure 6:
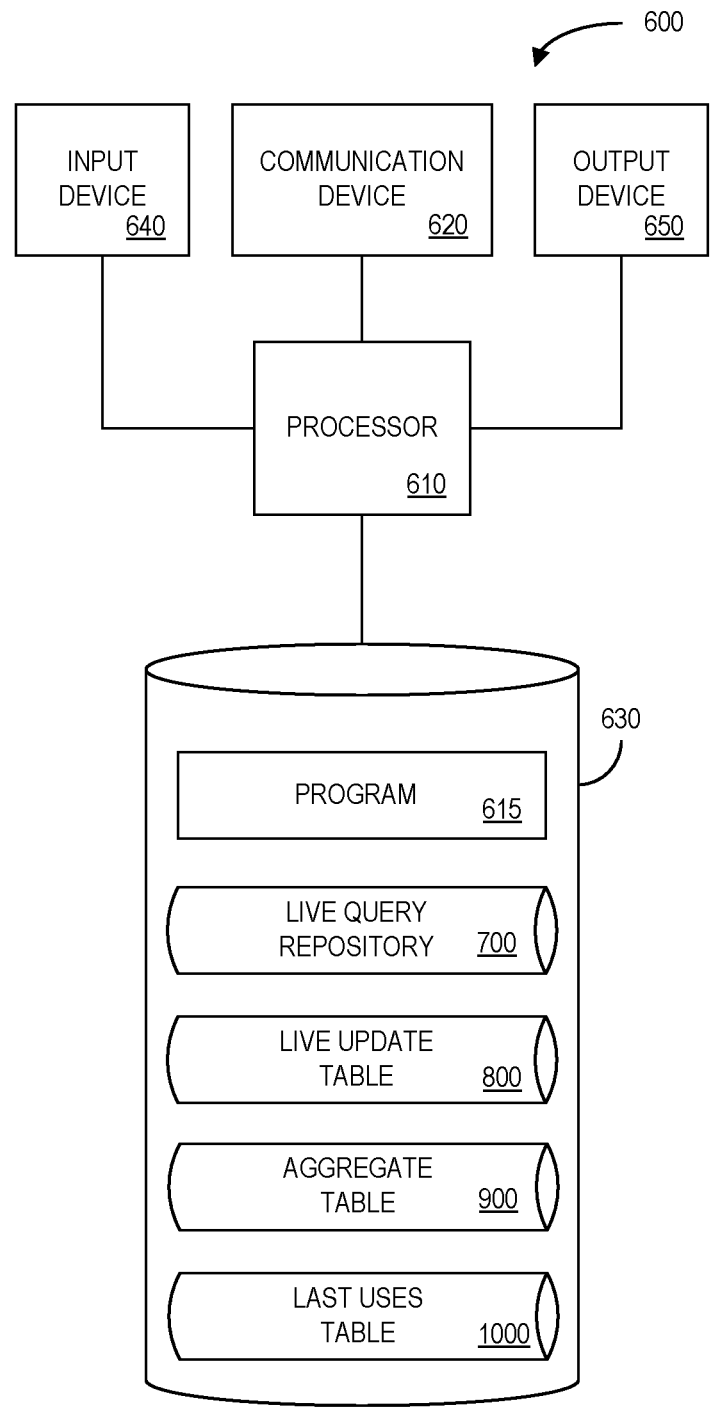
FIG. 6 is a high level diagram of an apparatus or platform in accordance with some embodiments.

Embodiments described herein may comprise a tool or platform that coordinates and manages live queries in accordance with some embodiments. For example, FIG. 6 illustrates a process owner apparatus or platform 600 that may be, for example, associated with the systems 100, 500 of FIG. 1 or 5. The platform 600 comprises a processor 610, such as one or more commercially available Central Processing Units ("CPUs") in the form of one-chip microprocessors, coupled to a communication device 620 configured to communicate via a communication network (not shown in FIG. 6). The communication device 620 may be used to communicate, for example, with one or more remote user devices (e.g., PCs and smartphones). Note that communications exchanged via the communication device 620 may utilize security features, such as those between a public internet user and an internal network of the insurance enterprise. The security features might be associated with, for example, web servers, firewalls, and/or PCI infrastructure. The platform 600 further includes an input device 640 (e.g., a mouse and/or keyboard to enter information about candidate configuration rules, etc.) and an output device 650 (e.g., to output reports regarding live query execution times and/or overall system performance).

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 615 and/or an existing association review tool or application for controlling the processor 610. The processor 610 performs instructions of the program 615, and thereby operates in accordance with any of the embodiments described herein. For example, the processor 610 may receive an aggregation query from a remote user interface associated with a user and evaluate the aggregation query to determine if the aggregation query qualifies to be designated as a live query. The processor 610 may, if the aggregation query is designated as a live query by the aggregation query broker, store an indication of the aggregation query and automatically update a local dynamic result of the aggregation query when information in the big data database associated with the live query is changed.

The program 615 may be stored in a compressed, uncompiled and/or encrypted format. The program 615 may furthermore include other program elements, such as an operating system, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source. In some embodiments (such as shown in FIG. 6), the storage device 630 further stores a live query repository 700, a live update table 800, an aggregate table 900, and a last uses table 1000. Examples of databases that might be used in connection with the platform 600 will now be described in detail with respect to FIGS. 7 through 10. Note that the databases described herein are only examples, and additional and/or different information may be stored therein. Moreover, various databases might be split or combined in accordance with any of the embodiments described herein. For example, live query repository 700 and/or live update table 800 might be combined and/or linked to each other within the program 615.

Figure 7:
FIG. 7 is a portion of a tabular live query repository database that might be provided according to some embodiments.

Referring to FIG. 7, a table is shown that represents the live query repository database 700 that may be stored at the platform 600 according to some embodiments. The table may include, for example, entries identifying live queries and associated results that have been received by an aggregation query platform. The table may also define fields 702, 704, 706, 708, 710 for each of the entries. The fields 702, 704, 706, 708, 710 may, according to some embodiments, specify: a query identifier 702, a query 704, last uses 706, a live update identifier 708, and a result identifier 710. The data in the live query repository database 700 may be created and updated, for example, based on queries received from users (e.g., via interactive graphical displays).

The query identifier 702 may be, for example, a unique alphanumeric code identifying a live query. The query 704 might define the query, and the last uses 706 might point to an entry in the last uses table database 1000. The live update identifier 708 might be used to determine triggers associated with the live query, and the result identifier might point to an entry in an aggregate table database 900.

Figure 8:
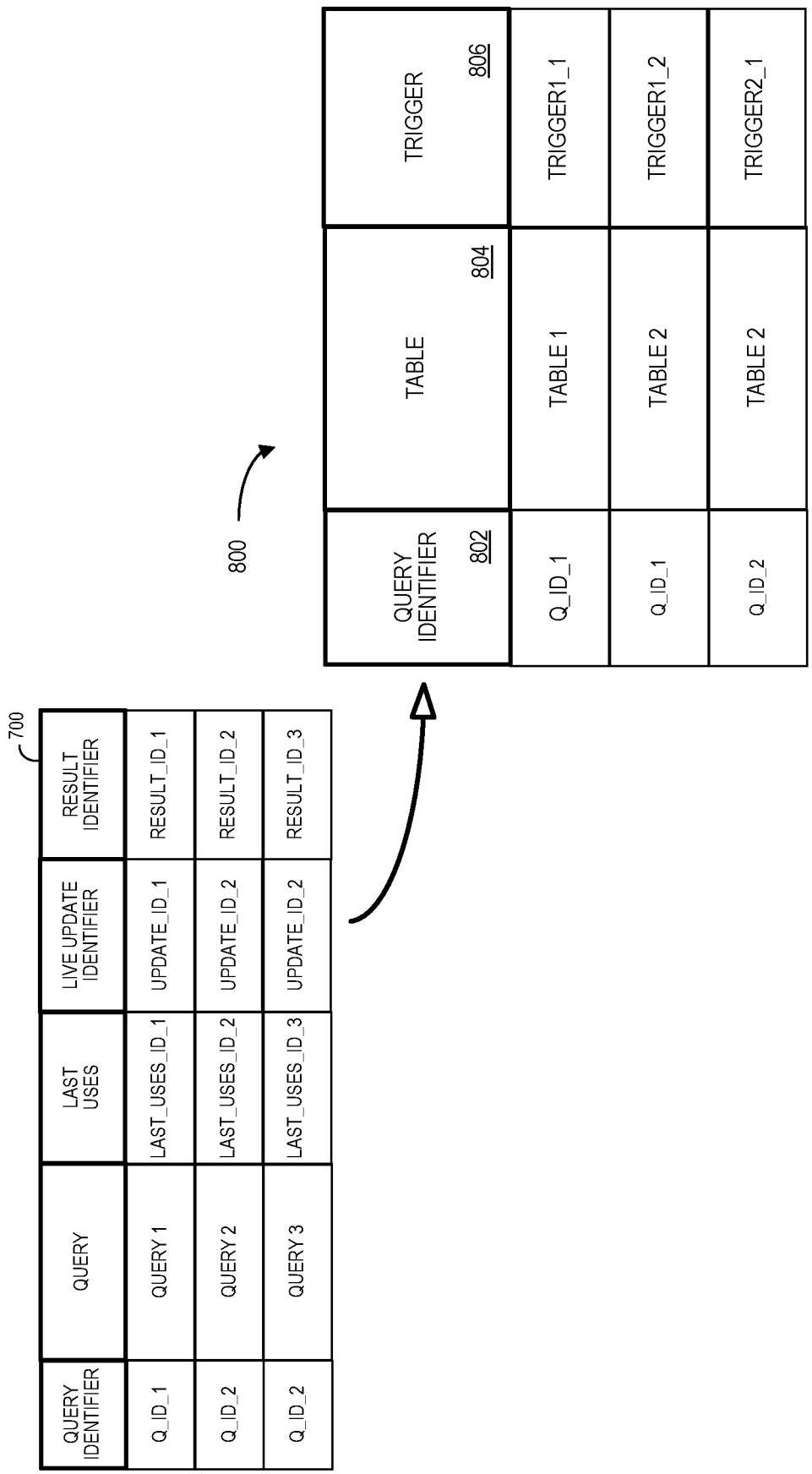
FIG. 8 is a portion of a live update table database that might be provided according to some embodiments.

Referring to FIG. 8, a table is shown that represents the live update table database 800 that may be stored at the platform 600 according to some embodiments. The table may, for example, map to the live query repository 700 (as illustrated by the arrow in FIG. 8) and include entries identifying live queries and information associated with the automatic update of the results (aggregate). The table may also define fields 802, 804, 806 for each of the entries. The fields 802, 804, 806 may, according to some embodiments, specify: a query identifier 802, a table 804, and a trigger 806. The data in the live update table database 800 may be created and updated, for example, based on queries received from users (e.g., via interactive graphical displays) and information known about an application database (e.g., to determine appropriate triggers).

The query identifier 802 may be, for example, a unique alphanumeric code identifying a live query and might be based on, or associated with, the query identifier 702 stored in the live query repository database. The table 804 may identify where information in application database is stored, and the trigger 806 might define when information from that table should be used to update a live query result (aggregate). That is, the table 804 and trigger 806 may be used to automatically update a local result of the aggregation query when information in a big data database is changed.

Figure 9:
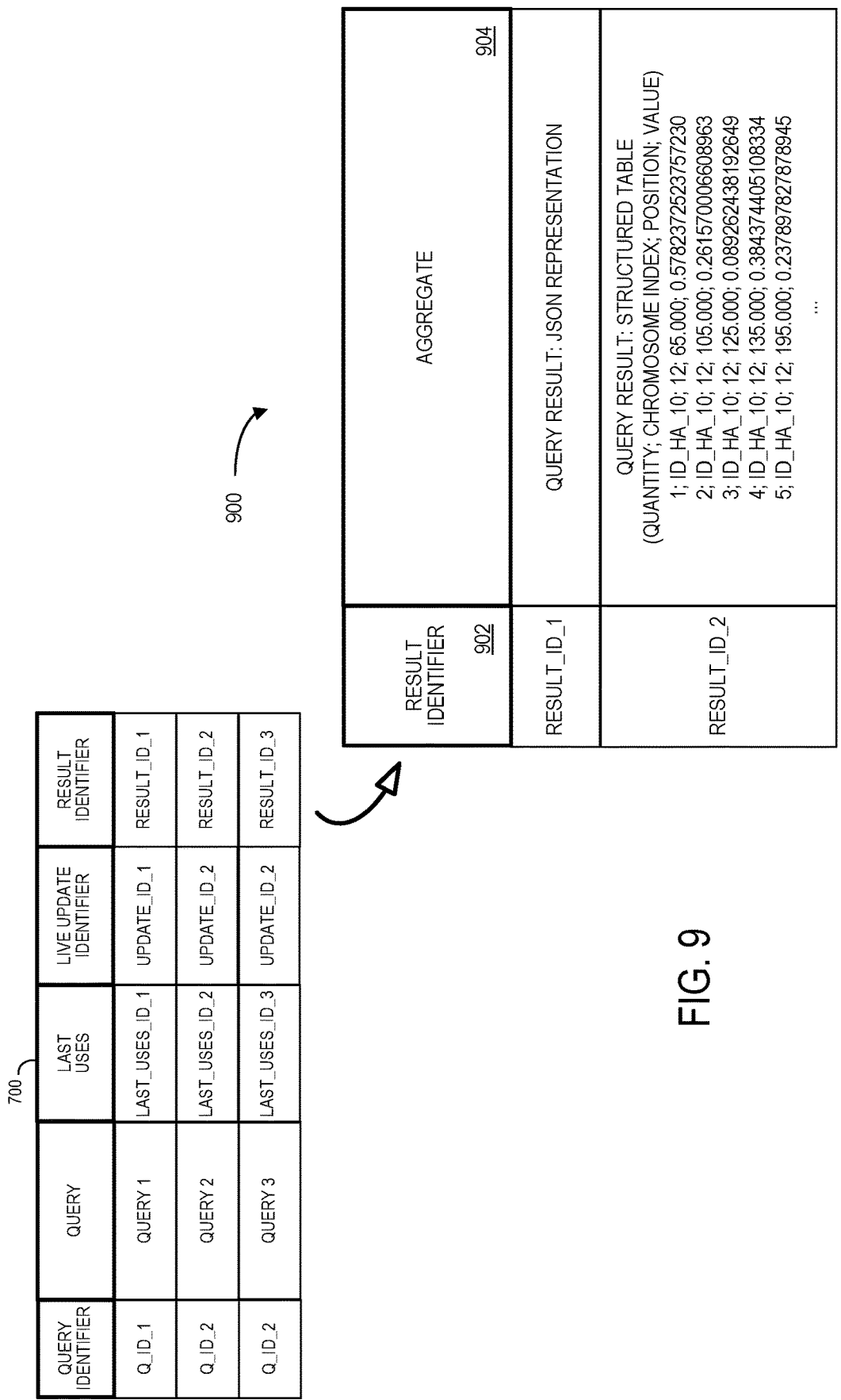
FIG. 9 is a portion of an aggregate table database that might be provided according to some embodiments.

Referring to FIG. 9, a table is shown that represents the aggregate table database 900 that may be stored at the platform 600 according to some embodiments. The table may, for example, map to the live query repository 700 (as illustrated by the arrow in FIG. 9) and include entries identifying live query results. The table may also define fields 902, 904 for each of the entries. The fields 902, 904 may, according to some embodiments, specify: a result identifier 902 and an aggregate 904. The data in the aggregate table database 900 may be created and updated, for example, based on queries received from users (e.g., via interactive graphical displays) and/or changes in an underlying application database.

The result identifier 902 may be, for example, a unique alphanumeric code associated with a live query result and may be based on, or associated with, the result identifier 710 in the live query repository 700. The aggregate 904 may include the data of the live query result. Note that the aggregate 904 might take various forms, including a JavaScript Object Notation ("JSON") representation of a query result, a structured table containing a query result, etc. Also note that the aggregate 904 may be automatically updated as define in the live update table database 800.

Figure 10:
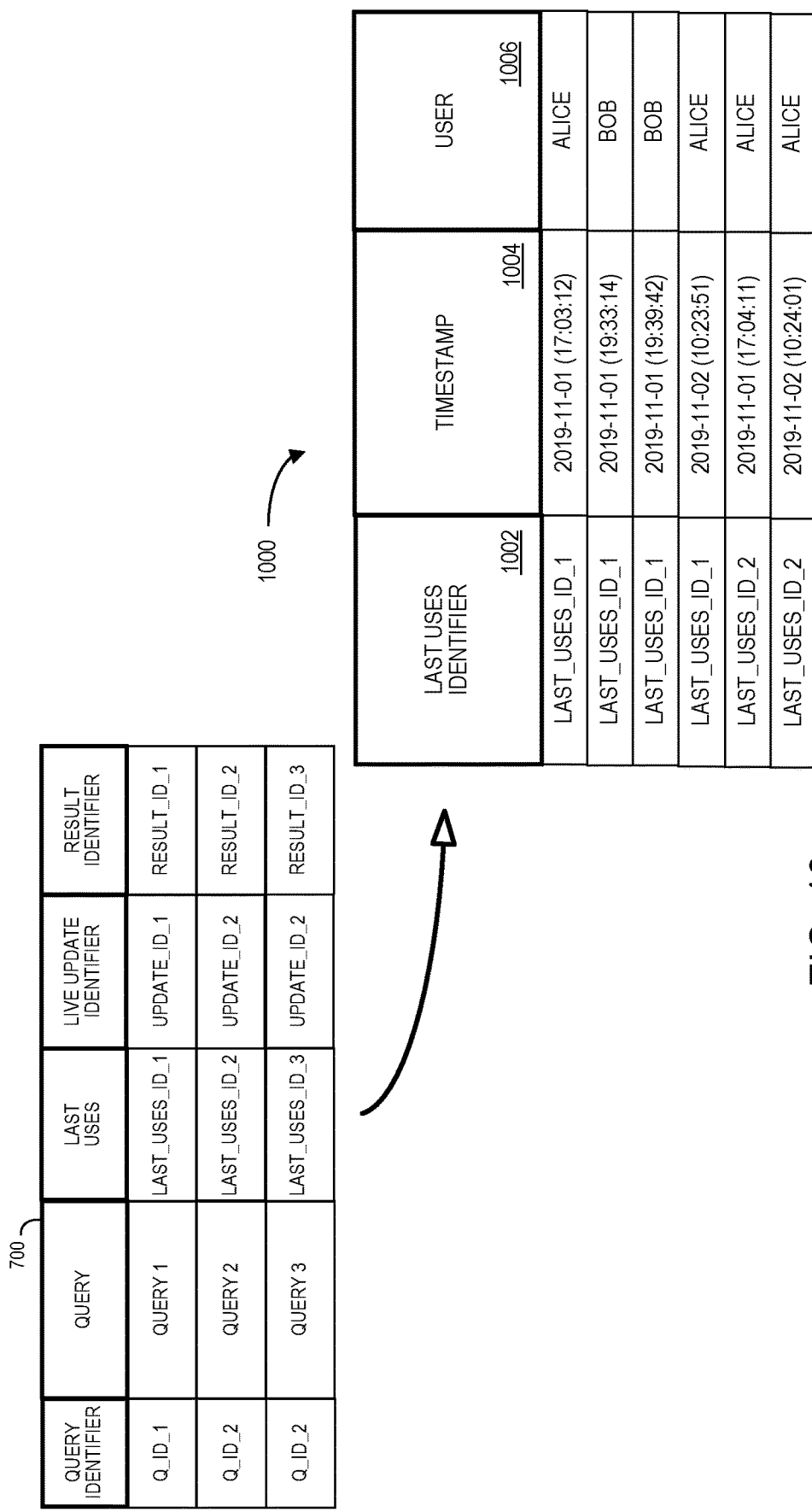
FIG. 10 is a portion of a last uses table database that might be provided according to some embodiments.

Referring to FIG. 10, a table is shown that represents the last uses table database 1000 that may be stored at the platform 600 according to some embodiments. The table may, for example, map to the live query repository (as illustrated by the arrow in FIG. 10) and include entries identifying live queries. The table may also define fields 1002, 1004, 1006 for each of the entries. The fields 1002, 1004, 1006 may, according to some embodiments, specify: a last uses identifier 1002, a timestamp 1004, and a user 1006. The data in the last uses table database 1000 may be created and updated, for example, based on queries received from users (e.g., via interactive graphical displays).

The last uses identifier 1002 may be, for example, a unique alphanumeric code identifying a last usage of a live query and might be based on, or associated with the last uses 706 stored in the live query repository 700. The timestamp 1004 might indicate a date and time-of-day when the live query was used. The user 1006 might indicate who submitted the live query to the aggregation query platform. The timestamp 1004 and user 1006 might be used, for example, to determine if and when a live query should be demoted to candidate query status (e.g., either because it is infrequently used or not used by many different users and therefore not worth the load required to keep the aggregate up-to-date).

Thus, embodiments may enable a fast and efficient handling of big data use analytics. While existing big-data in-memory engines re-calculate queries as they are received, embodiments described herein may improve performance (e.g., speed and processing power requirements) by intelligently incorporating previously calculated queries. Note that such an approach is different from standard result caching. For example, live queries may not just store static snapshots of former query executions, but instead keep those results up-to-date when the underlying data is changed. The desired fast availability of aggregates calculated from live queries may, however, come at a cost associated with increased background load. Therefore, embodiments may also determine which queries are worth promoting to live query status (e.g., using self-adjusting selection criteria and a constant re-evaluation of promotions and demotions for the candidates and live queries).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

Figure 11:
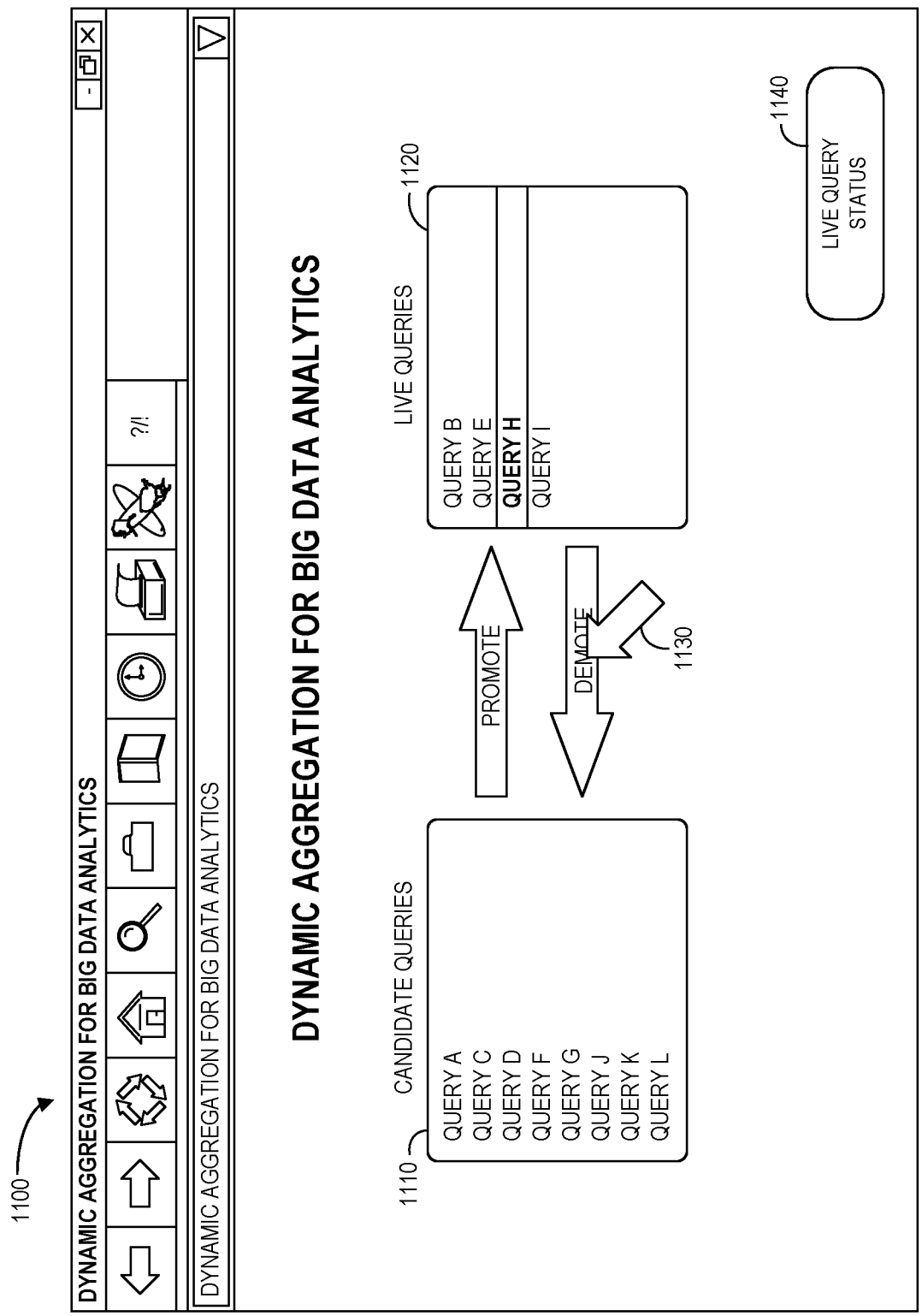
FIG. 11 illustrates a graphical user interface display that might be provided according to some embodiments.

FIG. 11 illustrates a graphical user interface display 1100 that might be provided according to some embodiments. In particular, the display 1100 includes a visual representation of candidate queries 1110 (e.g., queries A, C, D, . . . ) and live queries 1120 (e.g., queries B, E, H, . . . ). Note that these categorizations might initially be automatically made by the system. According to some embodiments, the display 1100 might allow for the manual override of these automatic characterizations. For example, selection of a "Promote" icon or "Demote" icon via a touchscreen or computer mouse pointer 1130 might move a highlighted query (e.g. "Query H" as illustrated in FIG. 11) into a different category. Other icons 1140 might, for example, save information, reset information, update a live query status, generation of an audit report (e.g., indicating when and where decisions were made), export data to other applications, etc.

Figure 12:
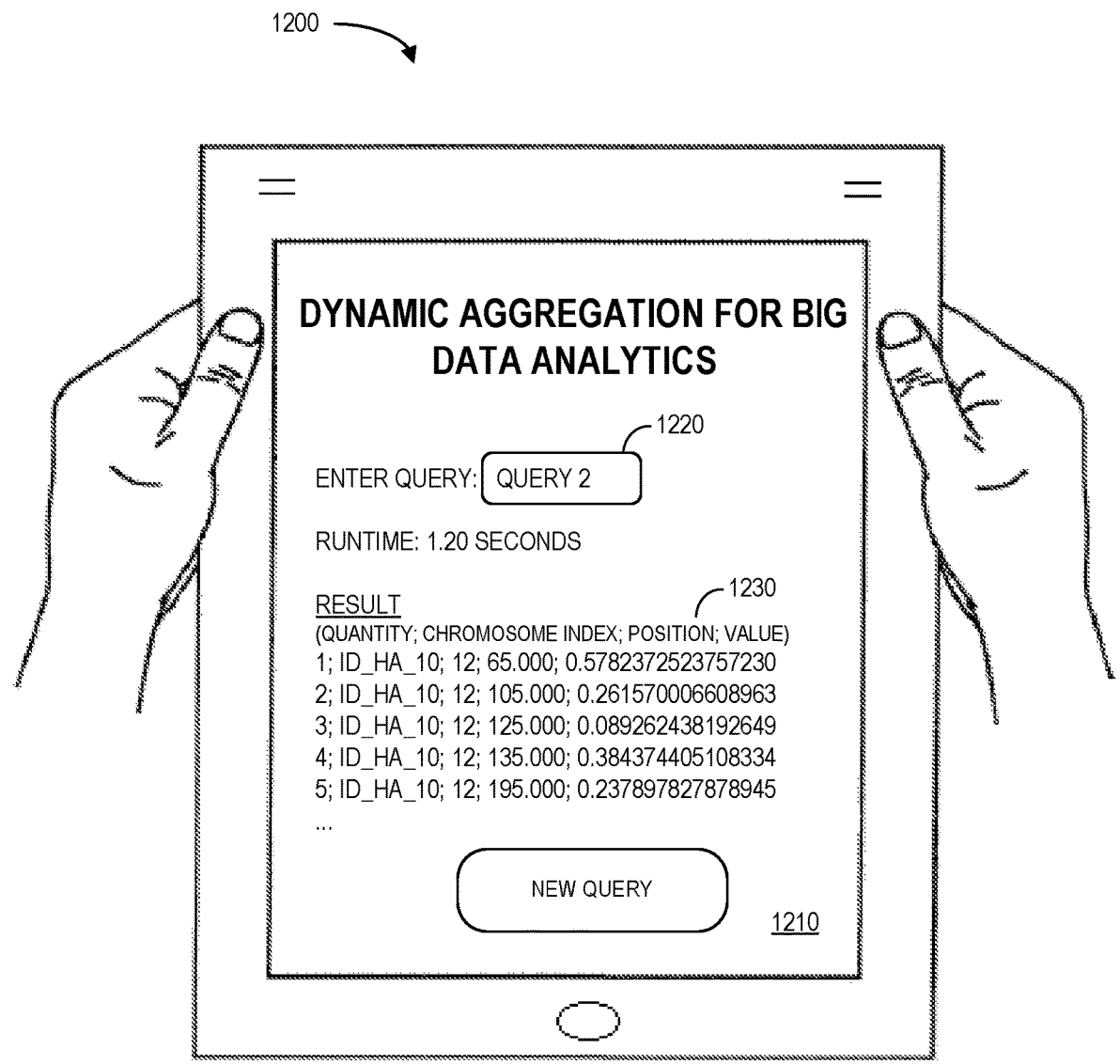
FIG. 12 illustrates a tablet or handheld computer being used according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of candidate configurations, embodiments may instead be associated with other types of data (e.g., additional information might be collected and/or automatically determined to promote candidates, demote live queries, etc.). Still further, the displays and devices illustrated herein are only provided as examples, and embodiments may be associated with any other types of user interfaces. For example, FIG. 12 illustrates a tablet or handheld computer 1200 being used according to some embodiments. In particular, the computer 1200 includes a display 1210 associated with dynamic aggregation for big data analytics. The display 1210 might, for example, comprise a user interface that can be utilized to submit a query 1220 to an aggregation query platform or broker. Moreover, the display might include a result 1230 (aggregate) and selection of a graphical element via touch screen interface may result in, for example, a pop-up window displaying further details about that element, allow for operator modification of the element, etc.

Embodiments described herein are solely for the purpose of illustration. Those in the art will recognize other embodiments may be practiced with modifications and alterations to that described above.

What is claimed is:

1. A system, comprising:
a big data database storing information to be used to generate results of aggregation queries; and
an aggregation query platform coupled to the big data database, including:
a communication port to exchange information with remote user interfaces, an aggregation query broker, including:
a memory storing processor-executable program code, and
a processor to execute the processor-executable program code in order to cause the aggregation query broker to:
receive an aggregation query from a remote user interface associated with a user via the communication port, and evaluate the aggregation query to determine when the aggregation query qualifies to be designated as a live query, and a dynamic aggregation engine adapted to:
when the aggregation query is designated as a live query by the aggregation query broker:
store an indication of the aggregation query, and
automatically update a local dynamic result of the aggregation query when information in the big data database associated with the live query is changed;
wherein the evaluation to determine when the aggregation query qualifies to be designated as a live query is based at least in part on a number of times the aggregation query was received from the remote user interface associated with the user.

2. The system of claim 1, wherein the received aggregation query is associated with at least one of: (i) a cohort, (ii) a quasi-statistic entity, (iii) linkage disequilibria, (iv) a filtered subset of a result set, (v) a count operation, (vi) an average operation, (vii) a mean operation, (viii) a variant density, and (ix) an operation combined with a filter.

3. The system of claim 1, wherein the evaluation to determine when the aggregation query qualifies to be designated as a live query is based at least in part on a number of times the aggregation query was received from remote user interfaces associated with other users.

4. The system of claim 1, wherein the evaluation to determine when the aggregation query qualifies to be designated as a live query is based at least in part on a query execution runtime associated with aggregation query.

5. The system of claim 1, wherein the evaluation to determine when the aggregation query qualifies to be designated as a live query is performed by a candidate promoter that evaluates a plurality of potential live queries stored in a candidate repository.

6. The system of claim 5, wherein the candidate promoter utilizes candidate configuration rules associated with at least one of: (i) a current system load, (ii) a number of times the aggregation query has been received within a pre-determined period of time, (iii) a number of unique users associated with the aggregation query, (iv) a number of current live queries as compared to a threshold value, (v) an invalidation time window, and (vi) a self-adjusting promotion rule.

7. The system of claim 5, wherein the candidate promoter further evaluates a plurality of live queries to determine when any of the live queries should be demoted to a potential live query.

8. The system of claim 1, wherein the big data database is associated with pre-aggregated data and in-memory on-the-fly computed data.

9. The system of claim 1, wherein the local dynamic result is automatically updated by creating triggers on tables and views associated with the big data database.

10. A computer-implemented method, comprising:
receiving, by an aggregation query broker of an aggregation query platform, an aggregation query from a remote user interface associated with a user, the aggregation query being associated with a big data database storing information to be used to generate results of aggregation queries;

evaluating, by the aggregation query broker, the aggregation query to determine when the aggregation query qualifies to be designated as a live query;

and when the aggregation query is designated as a live query by the aggregation query broker:

storing by a dynamic aggregation engine an indication of the aggregation query, and automatically updating, by the dynamic aggregation engine, a local dynamic result of the aggregation query when information in the big data database associated with the live query is changed;

wherein the evaluation to determine when the aggregation query qualifies to be designated as a live query is based at least in part on a number of times the aggregation query was received from the remote user interface associated with the user.

11. The method of claim 10, wherein the received aggregation query is associated with at least one of: (i) a cohort, (ii) a quasi-statistic entity, (iii) linkage disequilibria, (iv) a filtered subset of a result set, (v) a count operation, (vi) an average operation, (vii) a mean operation, (viii) a variant density, and (ix) an operation combined with a filter.

12. The method of claim 10, wherein the evaluation to determine when the aggregation query qualifies to be designated as a live query is based at least in part on a number of times the aggregation query was received from remote user interfaces associated with other users.

13. The method of claim 10, wherein the evaluation to determine when the aggregation query qualifies to be designated as a live query is based at least in part on a query execution runtime associated with aggregation query.

14. A non-transitory, computer-readable medium storing program code, the program code executable by a processor of an aggregation query platform to cause the aggregation query platform to perform a method comprising:

receiving an aggregation query from a remote user interface associated with a user, the aggregation query being associated with a big data database storing information to be used to generate results of aggregation queries;

evaluating the aggregation query to determine when the aggregation query qualifies to be designated as a live query;

and when the aggregation query is designated as a live query by the aggregation query broker:

storing an indication of the aggregation query, and automatically updating a local dynamic result of the aggregation query when information in the big data database associated with the live query is changed;

wherein the evaluation to determine if the aggregation query qualifies to be designated as a live query is performed by a candidate promoter that evaluates a plurality of potential live queries stored in a candidate repository.

15. The medium of claim 14, wherein the candidate promoter utilizes candidate configuration rules associated with at least one of: (i) a current system load, (ii) a number of times the aggregation query has been received within a pre-determined period of time, (iii) a number of unique users associated with the aggregation query, (iv) a number of current live queries as compared to a threshold value, (v) an invalidation time window, and (vi) a self-adjusting promotion rule.

16. The medium of claim 14, wherein the candidate promoter further evaluates a plurality of live queries to determine when any of the live queries should be demoted to a potential live query.

17. The medium of claim 14, wherein the big data database is associated with pre-aggregated data and in-memory on-the-fly computed data.

18. The medium of claim 14, wherein the local dynamic result is automatically updated by creating triggers on tables and views associated with the big data database.

* * * * *